United States Patent
Casto, II

[11] Patent Number: 5,406,803
[45] Date of Patent: Apr. 18, 1995

[54] DEVICES FOR INSTANTLY FREEZING GOOD PRODUCTS THROUGH THE APPLICATION OF GASEOUS MATERIALS

[76] Inventor: Arlos F. Casto, II, Rte. 9 Box 89A, Marietta, Ohio 45750

[21] Appl. No.: 158,387
[22] Filed: Nov. 29, 1993
[51] Int. Cl.⁶ .................................. F25B 19/02
[52] U.S. Cl. .............................. 62/52.1; 62/248; 62/371; 62/457.9
[58] Field of Search ............. 62/52.1, 457.9, 371, 62/248

[56] References Cited

U.S. PATENT DOCUMENTS

| | | | |
|---|---|---|---|
| 2,050,353 | 8/1936 | Matteson et al. | 62/248 |
| 3,258,931 | 7/1966 | Kelly et al. | 62/52.1 |
| 3,287,925 | 11/1966 | Kane et al. | 62/52.1 |
| 3,633,381 | 1/1972 | Haaf | 62/457.9 |
| 3,959,982 | 6/1976 | Denis et al. | 62/371 |
| 4,580,411 | 8/1986 | Orfitelli | 62/459.9 |
| 4,991,402 | 2/1991 | Saia, III | 62/457.9 |

Primary Examiner—Ronald C. Capossela

[57] ABSTRACT

A new and improved device having a chamber for the receipt of food products to be instantly frozen comprising a container having side walls and a rear wall in a vertical orientation and having a top wall and a bottom wall the edges of which are coupled to the edges of the side and rear walls, and having an opening at the front thereby forming a chamber within the walls. A door is positionable over the open front with a hinge coupling the side of the door with an adjacent edge of the container. A manifold is positioned within the chamber and secured to depend from the upper wall with openings spaced along its lower extent and a central passageway extending therethrough. A tube couples the manifold with a source of freezing gas located exterior of the device. Control means are adapted to project a flow of freezing gases from the container through the tube to the manifold for being dispensed to food products located within the chamber to be frozen.

5 Claims, 3 Drawing Sheets

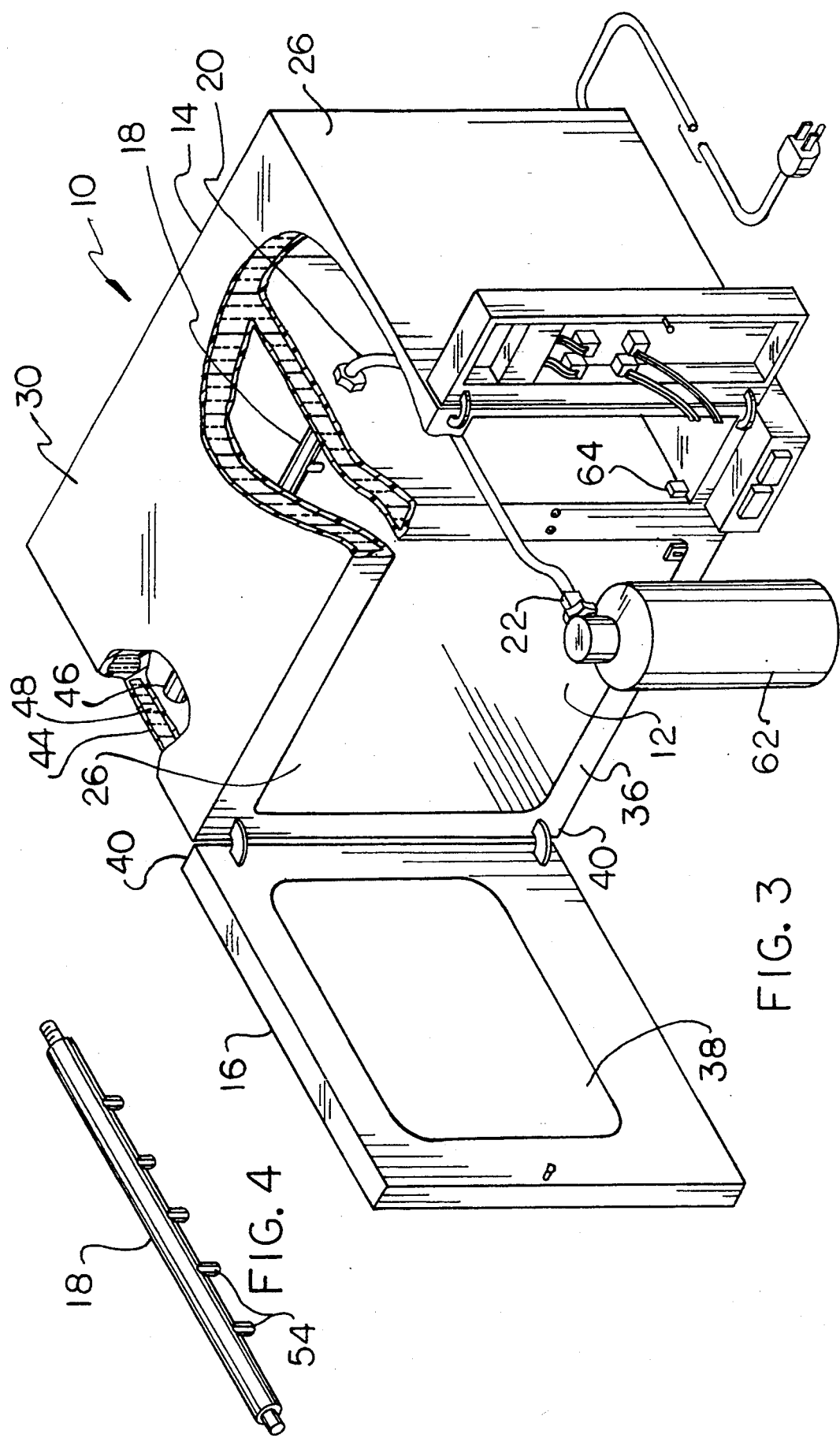

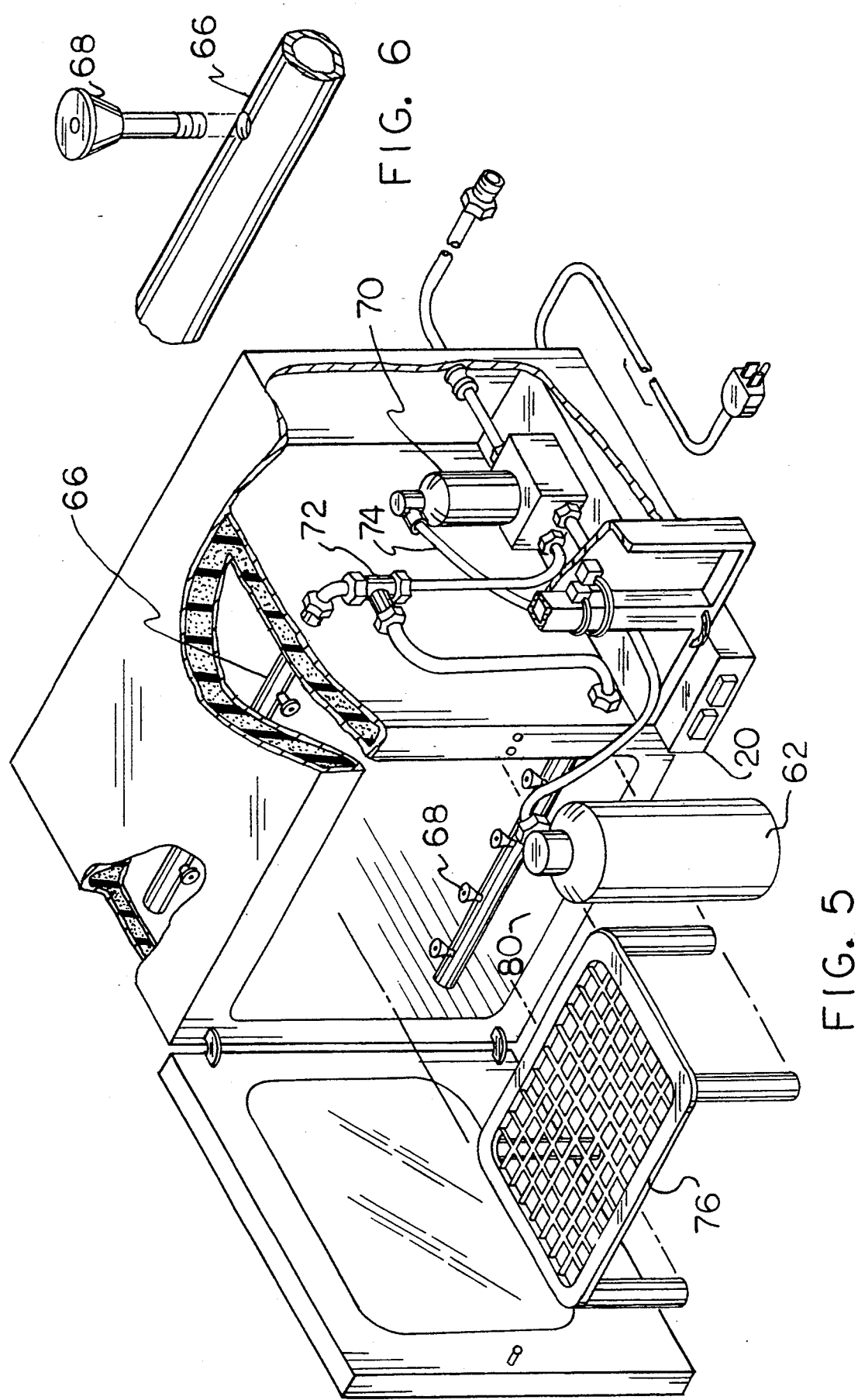

DEVICES FOR INSTANTLY FREEZING GOOD PRODUCTS THROUGH THE APPLICATION OF GASEOUS MATERIALS

BACKGROUND OF THE INVENTION

1. Field of the Invention

The present invention relates to new and improved devices for instantly freezing food products through the application of gaseous materials and more particularly pertains to instantly freezing food products through the application of an appropriate gas into an enclosed chamber containing the food products.

2. Description of the Prior Art

The use of freezing chambers for the purpose of freezing foods is known in the prior art. More specifically, freezing chambers for the purpose of freezing foods heretofore devised and utilized for the purpose of instantly freezing food are known to consist basically of familiar, expected, and obvious structural configurations, notwithstanding the myriad of designs encompassed by the crowded prior art which has been developed for the fulfillment of countless objectives and requirements.

The prior art discloses a large number of freezing chambers for the purpose of freezing foods. By way of example, U.S. Pat. No. 4,030,898 to Morita discloses a quick freezing apparatus.

U.S. Pat. No. 4,448,029 to Keller discloses a process for quick freezing and conditioning individual products, and apparatus for practicing this process.

U.S. Pat. No. 4,881,379 to Sakai discloses a continuous quick freezing apparatus for food.

U.S. Pat. No. 5,033,272 to Yoshikawa discloses a freezer-refrigerator.

U.S. Pat. No. 5,154,064 to Franklin discloses a food freezing and cool water and slush ice producer.

Lastly, U.S. Pat. No. 5,168,723 to Kiczek discloses a method and apparatus for individually quick freezing small surface moist articles.

In this respect, devices for instantly freezing food products through the application of gaseous materials according to the present invention substantially depart from the conventional concepts and designs of the prior art, and in doing so provide an apparatus primarily developed for the purpose of instantly freezing food products through the application of an appropriate gas into an enclosed chamber containing the food products.

Therefore, it can be appreciated that there exists a continuing need for new and improved devices for instantly freezing food products through the application of gaseous materials which can be used for instantly freezing food products through the application of an appropriate gas into an enclosed chamber containing the food products. In this regard, the present invention substantially fulfills this need.

SUMMARY OF THE INVENTION

In view of the foregoing disadvantages inherent in the known types of freezing chambers for the purpose of freezing foods now present in the prior art, the present invention provides improved devices for instantly freezing food products through the application of gaseous materials. As such, the general purpose of the present invention, which will be described subsequently in greater detail, is to provide new and improved devices for instantly freezing food products through the application of gaseous materials and methods which have all the advantages of the prior art and none of the disadvantages.

To attain this, the present invention essentially comprises a new and improved device having a chamber for the receipt of food products to be instantly frozen comprising a container which has rectangular side walls and a rear wall in a vertical orientation and which has a top wall and a bottom wall the edges of which are coupled to the top and bottom edges of the side and rear walls. It has an opening at the front and thereby forms a chamber within the walls. A door with a window in a rectangular configuration is positionable over the open front with a hinge coupling the side of the door with an adjacent edge of the container. The walls of the container include an exterior shell, an interior lining and insulation therebetween. A manifold is positioned within the chamber which is laterally spaced from locations adjacent the side walls and secured to depend from the upper wall with openings spaced along its lower extent and a central passageway extending therethrough. A tube couples the manifold with a source of freezing gas located exterior of the device. Control means are adapted to project a flow of freezing gases from the container through the tube to the manifold for being dispensed to food products located within the chamber to be frozen with associated safety means interlocking the door and the control means for dispensing fluid material only when the door is closed. The fluid is selected from the class of freezing gases comprising nitrogen dioxide, carbon dioxide and propane. A supplemental manifold is located parallel with the first mentioned manifold but located adjacent to the lowermost extent of the chamber with upwardly directing nozzles and a supplemental container of gaseous freezing material with a supplemental line coupling the supply with the supplemental manifold. A rack positions the food to be frozen at an elevated location above the floor and nozzles.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved devices for instantly freezing food products through the application of gaseous materials which have all the advantages of the prior art freezing chambers for the purpose of freezing foods and none of the disadvantages.

It is another object of the present invention to provide new and improved devices for instantly freezing food products through the application of gaseous materials which may be easily and efficiently manufactured and marketed.

It is a further object of the present invention to provide new and improved devices for instantly freezing food products through the application of gaseous materials which are of a durable and reliable construction.

An even further object of the present invention is to provide new and improved devices for instantly freezing food products through the application of gaseous materials which are susceptible of a low cost of manufacture with regard to both materials and labor, and which accordingly are then susceptible of low prices of sale to the consuming public, thereby making such devices for instantly freezing food products through the application of gaseous materials economically available to the buying public.

Still yet another object of the present invention is to provide new and improved devices for instantly freezing food products through the application of gaseous materials which provide in the apparatuses and methods of the prior art some of the advantages thereof, while simultaneously overcoming some of the disadvantages normally associated therewith.

Even still another object of the present invention is to instantly freeze food products through the application of an appropriate gas into an enclosed chamber containing the food products.

Lastly, it is an object of the present invention to provide a new and improved device having a chamber for the receipt of food products to be instantly frozen comprising a device having a chamber for the receipt of food products to be instantly frozen comprising a container having side walls and a rear wall in a vertical orientation and having a top wall and a bottom wall the edges of which are coupled to the edges of the side and rear walls, and having an opening at the front thereby forming a chamber within the walls. A door is positionable over the open front with a hinge coupling the side of the door with an adjacent edge of the container. A manifold is positioned within the chamber and secured to depend from the upper wall with openings spaced along its lower extent and a central passageway extending therethrough. A tube couples the manifold with a source of freezing gas located exterior of the device. Control means are adapted to project a flow of freezing gases from the container through the tube to the manifold for being dispensed to food products located within the chamber to be frozen.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective illustration of the device shown in FIG. 1 but with parts broken away to show certain internal constructions thereof.

FIG. 4 is an enlarged perspective illustration of the manifold used in association with the device of the prior Figures.

FIG. 5 is a perspective illustration similar to FIG. 3 but illustrating an alternate embodiment of the invention.

FIG. 6 is s cross-sectional view taken along line 6—6 of FIG. 5.

The same reference numerals refer to the same parts throughout the various Figures.

DESCRIPTION OF THE PREFERRED EMBODIMENT

Figure 1:
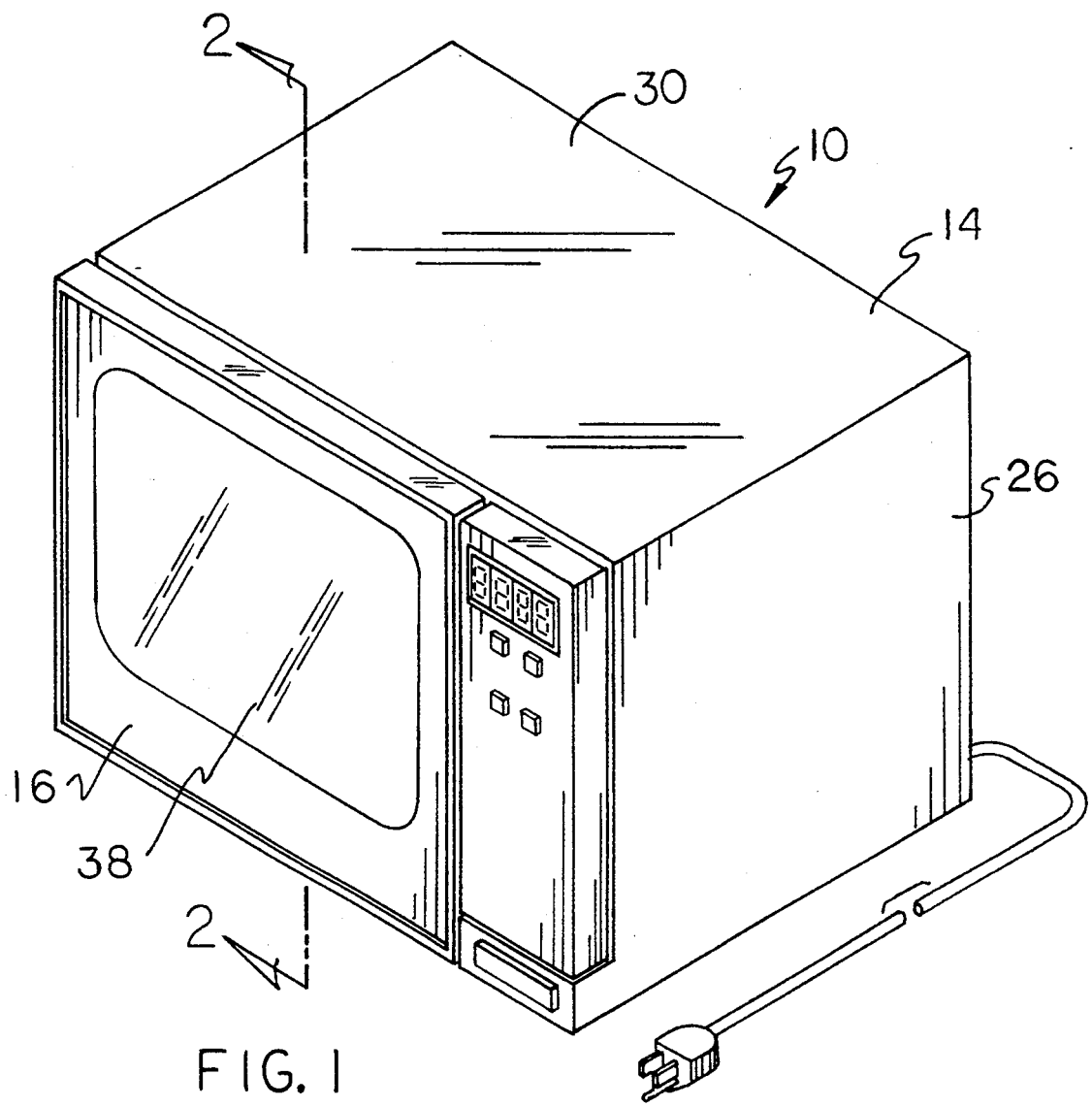
FIG. 1 is a perspective illustration of the preferred embodiment of the devices for instantly freezing food products through the application of gaseous materials constructed in accordance with the principles of the present invention.
Figure 2:
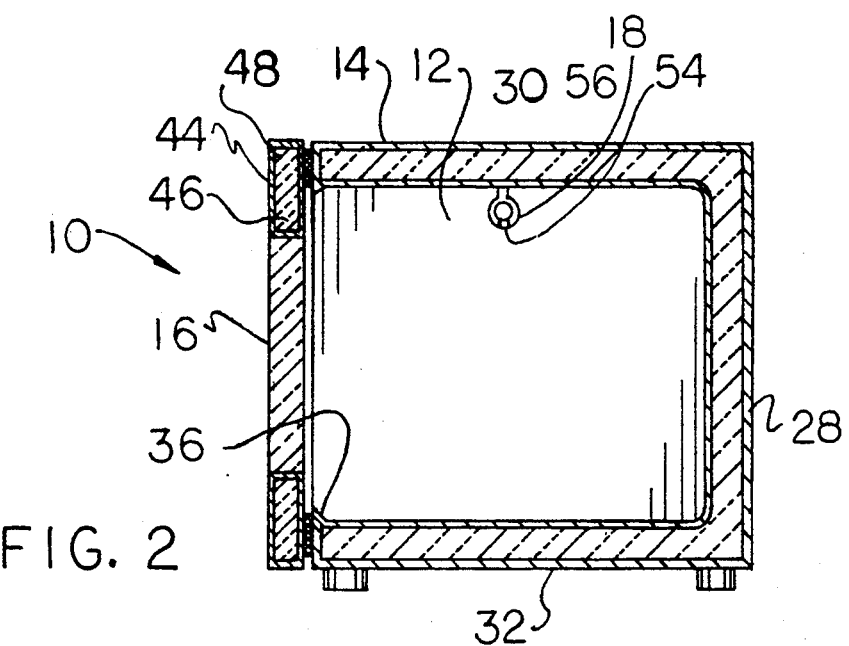
FIG. 2 is a cross-sectional view of the device shown in FIG. 1 taken along line 2—2 of FIG. 1.

With reference now to the drawings, and in particular to FIG. 1 thereof, the preferred embodiment of the new and improved devices for instantly freezing food products through the application of gaseous materials embodying the principles and concepts of the present invention and generally designated by the reference numeral 10 will be described.

Specifically, it will be noted with reference to FIGS. 1 through 4 that the present invention is a new and improved device 10 having a chamber 12 for the receipt of food products to be instantly frozen. In its broadest context, the device 10 has a container 14, a door 16, a manifold 18, a tube 20 and control means 22. These components are configured and arranged to achieve the intended results.

More specifically, the device 10 includes a container 14. The container has rectangular side walls 26 and a rear wall 28 in a vertical orientation and a top wall 30 and a bottom wall 32. The edges of the walls together to form a rectangular chamber 12. The container 14 also has an opening 36 at the front and thereby forms the chamber 12 within the walls.

A door 16 is provided with a window 38 in a rectangular configuration. The door is positionable over the open front 36. A hinge 40 couples the side of the door 16 with an adjacent edge of the container 14. The walls of the container 14 include an exterior shell 44, an interior lining 46 and insulation 48 therebetween.

A manifold 18 is positioned within the chamber 12. The manifold is laterally spaced from locations adjacent the side walls 26. It is secured to depend from the top wall 30. Openings 54 are spaced along the lower extent of the manifold and a central passageway 56 extends therethrough.

A tube 20 couples the manifold 18 with a container 62 as a source of freezing gas. Such source is located exterior of the device 10.

Control means 22 are adapted to project a flow of freezing gases from the container 62, through the tube 60 to the manifold 18 for being dispensed to food products located within the chamber 12. It is such food which is to be frozen. Associated safety control means 64, operatively coupled with the door 16 and control means 22, interlock the door whereby the control means 22 can function for dispensing fluid material only when the door is closed. The fluid is preferably selected from the class of freezing gases comprising nitrogen dioxide, carbon dioxide and propane.

An alternate embodiment of the invention is shown in FIGS. 5 and 6. In such embodiment, a supplemental manifold 66 is located parallel with the first mentioned manifold 18. The supplemental manifold 66 is located adjacent to the lowermost extent of the chamber 12. It has upwardly directing nozzles 68 and a supplemental container 70 of gaseous freezing material. It also has a supplemental line 74 coupling the supply container 70 with the supplemental manifold 66. The lines 20 and 74 are preferably coupled at a fitting 72 whereby both manifolds 18 and 66 may be supplied by one source 62 or the other source 70.

In this embodiment, a rack 76 is also provided. It functions for positioning the food to be frozen at an elevated location above the floor 80 of the chamber 12 and the nozzles 68.

The present invention is a device used to instantly freeze water, desserts and other food products. It is a countertop appliance, similar in size and configuration to that of a microwave oven. The present invention can use liquid carbon dioxide, liquid nitrogen dioxide or even propane to quickly freeze water for large quantities of ice for parties and to fast freeze meat, poultry and leftovers. This convenient device may be assembled with a conventional sheet metal shell or with recycled microwave shells. The interior is sanitary stainless steel. Other components consist of easily obtained materials and all parts are easily replaced. The present invention will not only appeal to the general public but to the food service and hospitality industries as well.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved device having a chamber for the receipt of food products to be instantly frozen comprising, in combination:

a container having rectangular side walls and a rear wall in a vertical orientation and having a top wall and a bottom wall the edges of which are coupled to the top and bottom edges of the side and rear walls, and having an opening at the front thereby forming a chamber within the walls;

a door with a window in a rectangular configuration positionable over the open front with a hinge coupling the side of the door with an adjacent edge of the container;

the walls of the container including an exterior shell, an interior lining and insulation therebetween;

a manifold positioned within the chamber laterally spaced from locations adjacent the side walls and secured to depend from the upper wall with openings spaced along its lower extent and a central passageway extending therethrough;

a tube coupling the manifold with a source of freezing gas located exterior of the device;

control means adapted to project a flow of freezing gases from the container through the tube to the manifold for being dispensed to food products located within the chamber to be frozen with associated safety means interlocking the door and the control means for dispensing fluid material only when the door is closed;

the fluid being selected from the class of freezing gases comprising nitrogen dioxide, carbon dioxide and propane;

a supplemental manifold located parallel with the first mentioned manifold but located adjacent to the lowermost extent of the chamber with upwardly directing nozzles and a supplemental container of gaseous freezing material with a supplemental line coupling the supply with the supplemental manifold; and a rack for positioning the food to be frozen at an elevated location above the floor and nozzles.

2. A device having a chamber for the receipt of food products to be instantly frozen comprising:

a container having side walls and a rear wall in a vertical orientation and having a top wall and a bottom wall the edges of which are coupled to the edges of the side and rear walls, and having an opening at the front thereby forming a chamber within the walls;

a door positionable over the open front with a hinge coupling the side of the door with an adjacent edge of the container;

a manifold positioned within the chamber and secured to depend from the upper wall with openings spaced along its lower extent and a central passageway extending therethrough;

a tube coupling the manifold with a source of freezing gas located exterior of the device;

control means adapted to project a flow of freezing gases from the container through the tube to the manifold for being dispensed to food products located within the chamber to be frozen; and associated safety means within the chamber adjacent to the opening interlocking the door and the control means for allowing the dispensing fluid material only when the door is closed.

3. The device as set forth in claim 2 wherein the fluid is selected from the class of freezing gases comprising nitrogen dioxide, carbon dioxide and propane.

4. The device as set forth in claim 2 and further including:

a supplemental manifold located parallel with the first mentioned manifold but located adjacent to the lowermost extent of the chamber with upwardly directing nozzles and a supplemental container of gaseous freezing material with a supplemental line coupling the supply with the supplemental manifold.

5. The device as set forth in claim 2 and further including:

a rack for positioning the food to be frozen at an elevated location above the floor and nozzles.

* * * * *